US011841812B2

(12) United States Patent
Dekens

(10) Patent No.: US 11,841,812 B2
(45) Date of Patent: *Dec. 12, 2023

(54) DATA BUS BRIDGE

(71) Applicant: Nordic Semiconductor ASA, Trondheim (NO)

(72) Inventor: Berend Dekens, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,139

(22) Filed: May 20, 2022

(65) Prior Publication Data

US 2022/0374374 A1 Nov. 24, 2022

(30) Foreign Application Priority Data

May 24, 2021 (GB) ...................................... 2107392

(51) Int. Cl.
*G06F 13/28* (2006.01)
*G06F 9/46* (2006.01)
*G06F 13/362* (2006.01)
*G06F 13/40* (2006.01)

(52) U.S. Cl.
CPC .............. *G06F 13/28* (2013.01); *G06F 9/466* (2013.01); *G06F 13/362* (2013.01); *G06F 13/4059* (2013.01)

(58) Field of Classification Search
CPC ....................................................... G06F 13/28
USPC ....................................................... 710/305
See application file for complete search history.

(56) References Cited

U.S. PATENT DOCUMENTS

| 5,546,546 A  * | 8/1996 | Bell ..................... G06F 13/4031 |
| | | 710/100 |
| 5,634,138 A  * | 5/1997 | Ananthan ............... G06F 13/28 |
| | | 710/21 |
| 5,758,108 A  * | 5/1998 | Nakamura ................ G06F 1/26 |
| | | 710/305 |
| 5,809,260 A  * | 9/1998 | Bredin ................ G06F 13/4027 |
| | | 714/17 |
| 7,426,604 B1 | 9/2008 | Rygh et al. |

(Continued)

OTHER PUBLICATIONS

IPO Combined Search and Examination Report under Sections 17 and 18(3) for GB2107392.9, dated Feb. 21, 2022, 10 pages.

(Continued)

*Primary Examiner* — Titus Wong
(74) *Attorney, Agent, or Firm* — Klarquist Sparkman, LLP

(57) ABSTRACT

An electronic device comprises a bridge configured to transfer data bus transactions from a transaction source domain having a first bus width to a transaction target domain having a second bus width less than the first bus width. The bridge comprises a first interface configured to receive a transaction from the transaction source domain, where the transaction has a first transaction burst length. A converter logic is configured such that when a transaction is received via the first interface, the converter logic splits the transaction into a plurality of second transactions each having a respective second transaction burst length, wherein the plurality of second transactions have the second bus width. A second interface is configured to send the plurality of second transactions to the transaction target domain.

15 Claims, 2 Drawing Sheets

(56) References Cited

U.S. PATENT DOCUMENTS

| | | | |
|---|---|---|---|
| 7,730,244 B1* | 6/2010 | Ansari | G06F 13/385 |
| | | | 710/5 |
| 9,379,980 B1 | 6/2016 | Hedinger et al. | |
| 10,445,219 B1 | 10/2019 | Roy et al. | |
| 2003/0191884 A1 | 10/2003 | Anjo et al. | |
| 2005/0210164 A1* | 9/2005 | Weber | G06F 13/4018 |
| | | | 710/35 |
| 2005/0216641 A1* | 9/2005 | Weber | H04L 49/102 |
| | | | 710/307 |
| 2007/0081546 A1* | 4/2007 | Yap | H04L 12/40013 |
| | | | 370/423 |
| 2011/0225334 A1 | 9/2011 | Byrne et al. | |
| 2011/0283042 A1* | 11/2011 | Jeon | G06F 15/00 |
| | | | 711/E12.082 |
| 2013/0028261 A1 | 1/2013 | Lee | |
| 2015/0052271 A1 | 2/2015 | Liao et al. | |
| 2022/0374369 A1 | 11/2022 | Rygh | |
| 2022/0374383 A1 | 11/2022 | Dekens | |

OTHER PUBLICATIONS

U.S. Appl. No. 17/750,135, filed May 20, 2022, Dekens.
U.S. Appl. No. 17/750,144, filed May 20, 2022, Rygh.
IPO Combined Search and Examination Report under Sections 17 and 18(3) for GB2107390.3, dated Mar. 4, 2022, 9 pages.
IPO Combined Search and Examination Report under Sections 17 and 18(3) for GB2107393.7, dated Mar. 18, 2022, 11 pages.
XILINX®, "AXI Virtual FIFO Controller v2.0," LogiCORE IP Product Guide, Nov. 18, 2015, 43 pages.

* cited by examiner

DATA BUS BRIDGE

CROSS-REFERENCE TO RELATED APPLICATION

This application claims priority from United Kingdom Patent Application No. 2107392.9, filed May 24, 2021, which application is incorporated herein by reference in its entirety.

TECHNICAL FIELD

The present invention relates to a bridge for varying the length and width of transactions between different transaction domains in a data bus, particularly but not exclusively for AXI data buses.

BACKGROUND

Many modern electronic devices include a number of buses to allow different on-chip devices to communicate with one another. Generally, these buses connect at least one 'master' device to at least one 'slave' device, and allows the master to issue commands to and/or exchange data with the slave.

One bus that is commonly used for on-chip communication is the Advanced eXtensible Interface (AXI) bus, defined within the ARM® Advanced Microcontroller Bus Architecture specifications, e.g. the 'AXI3', 'AXI4', and 'AXI5' specifications. This packet-switched bus provides a high performance multi-master to multi-slave communication interface.

Another AXI-based protocol is 'AXI-Lite', which provides a more 'lightweight' bus that supports a single transaction thread per master. The AXI-Lite protocol is generally used for devices (e.g. a slave device) that needs to communicate with only a single master device simultaneously.

The AXI specification outlines five channels for transactions, these are: the Read Address channel (AR); the Read Data channel (R); the Write Address channel (AW); the Write Data channel (W); and the Write Response channel (B).

Those skilled in the art will appreciate that certain data bus protocols, such as the AXI protocol, are burst-based protocols, i.e. they support multiple transfers for a single request, where these transfers are referred to as 'beats'. The protocol in use may specify a limit on the transaction burst length. For example, in accordance with the AXI4 specification, the maximum allowable transaction burst length is 256 beats. Conversely, AXI-Lite allows only single data transfers, i.e. the burst length limit is 1 beat.

It will also be appreciated that a bus may be divided up into different bus partitions or domains, and that each of these may use a different bus width, i.e. the number of 'lanes' that each bus partition provides for the simultaneous transfer of data may be different. A 'bridge' may be used to connect such bus partitions having different bus widths.

SUMMARY

When viewed from a first aspect, embodiments of the present invention provide an electronic device comprising a bridge configured to transfer data bus transactions from a transaction source domain having a first bus width to a transaction target domain having a second bus width less than the first bus width, the bridge comprising:

a first interface configured to receive a transaction from the transaction source domain, said transaction having a first transaction burst length;

a converter logic configured such that when a transaction is received via the first interface, the converter logic splits said transaction into a plurality of second transactions each having a respective second transaction burst length, wherein the plurality of second transactions have the second bus width; and a second interface configured to send the plurality of second transactions to the transaction target domain.

The first aspect of the invention extends to a method of transferring data bus transactions from a transaction source domain having a first bus width to a transaction target domain having a second bus width less than the first bus width, the method comprising:

receiving a transaction from the transaction source domain, said transaction having a first transaction burst length;

when a transaction is received, splitting said transaction into a plurality of second transactions each having a respective second transaction burst length, wherein the plurality of second transactions have the second bus width; and sending the plurality of second transactions to the transaction target domain.

The first aspect of the present invention further extends to a non-transitory computer-readable medium comprising instructions that, when executed by a processor, cause the processor to carry out a method of transferring data bus transactions from a transaction source domain having a first bus width to a transaction target domain having a second bus width less than the first bus width, the method comprising:

receiving a transaction from the transaction source domain, said transaction having a first transaction burst length;

when a transaction is received, splitting said transaction into a plurality of second transactions each having a respective second transaction burst length, wherein the plurality of second transactions have the second bus width; and sending the plurality of second transactions to the transaction target domain.

The first aspect of the present invention also extends to a computer software product comprising instructions that, when executed by a processor, cause the processor to carry out a method of transferring data bus transactions from a transaction source domain having a first bus width to a transaction target domain having a second bus width less than the first bus width, the method comprising:

receiving a transaction from the transaction source domain, said transaction having a first transaction burst length;

when a transaction is received, splitting said transaction into a plurality of second transactions each having a respective second transaction burst length, wherein the plurality of second transactions have the second bus width; and sending the plurality of second transactions to the transaction target domain.

Thus it will be appreciated that embodiments of the present invention provide an arrangement in which incoming transactions are converting from a wider bus width to a narrower bus width (i.e. the transactions are 'down-sized'), and in which transactions are broken down into a number of smaller transactions (referred to as 'burst breaking'). This combination of features is referred to generally throughout this disclosure as 'down-breaking', because a single component (i.e. the bridge) performs both the down-sizing and burst breaking operations on the bus transactions. The second transaction burst length of the plurality of second transactions may be less than the first transaction burst length.

When a received transaction is down-sized from the wider first (i.e. source) bus width to the narrower (i.e. target) bus width, it generally grows in length such that the data is preserved. Without the present invention, this may result in the resultant transaction burst length after the down-sizing operation being greater than a maximum transaction burst length limit. Additionally or alternatively, embodiments of the present invention may perform this down-sizing operation to reduce transactions of any burst length to single beat bursts (e.g. to ensure that certain domains receive burst of up to 8 beats or 16 beats, instead of 256 beats). The bridge of the present invention advantageously splits the resultant transaction up into several shorter transactions (the 'second' transactions) when it performs the down-sizing from the wider bus width to the narrower one. Thus in accordance with the present invention, a single 'down-breaking' bridge provides for two-dimensional re-sizing of the transaction to make it suitable for downstream components.

This down-breaking functionality, provided by embodiments of the present invention, advantageously allows for the different transaction domains to be bridged by a single component. This readily allows connection of bus partitions that operate in accordance with different protocols. For example, the transaction source domain may be a bus partition operating in accordance with the AXI protocol, while the transaction target domain may be another bus partition operating in accordance with the AXI-Lite protocol.

The Applicant has appreciated that without the present invention, different components could be used to down-size transactions and to break up the burst lengths. However, this would generally lead to an increase in hardware and/or software requirements, which has a number of associated disadvantages. In particular, having separate components handling the down-sizing and burst breaking functions may require more physical space on the device, increase the bill of materials, and/or increase the power requirements of the device. The present invention may avoid some or all of these issues by having the same component (i.e. the bridge) carry out both functions, where the down-sizing and burst breaking functions may be carried out simultaneously.

By using the first transaction burst length, first bus width, and second bus width, and a suitable burst length limit (which may be any arbitrary value between one and the protocol burst length limit) the bridge may determine how many transactions at the narrower (second) bus will be needed and split the transaction accordingly.

The bridge may be arranged to split the transaction into multiple shorter transactions (i.e. having a shorter burst transaction length) only when the bridge determines that reducing the width of the transactions would result in a transaction having a burst transaction length exceeding a limit value. This limit value may be the maximum burst transaction length accepted by the transaction target domain.

Thus, in some embodiments, the converter logic is configured to determine whether reducing the transaction from the first bus width to the second bus width will result in a resultant transaction having a burst transaction length that exceeds a threshold value, said converter logic being further configured such that:

when the resultant transaction will have a burst transaction length that exceeds the threshold value, the converter logic splits said transaction into a plurality of second transactions each having a respective second transaction burst length that does not exceed the threshold value, wherein the plurality of second transactions have the second bus width; and when the resultant transaction will have a burst transaction length that does not exceed the threshold value, the resultant transaction having the second bus width is sent to the transaction target domain via the second interface.

The second transaction burst length of the plurality of second transaction may be less than the first transaction burst length of the first transaction, but arrangements are envisaged in which it might be longer, e.g. where the second domain allows for longer burst lengths than the first domain but where the length is still limited by the threshold value.

The bridge may receive one or more transaction responses from the transaction target domain via the second interface, and supply these to the transaction source domain via the first interface. When a transaction response is received from the transaction target domain, this response will generally have the second bus width, and may be provided as a plurality of transaction responses (e.g. a number of bursts responsive to each of the plurality of second transactions sent via the second interface). The converter logic may be arranged to combine the plurality of transaction responses to generate one or more second transaction response(s) having the first bus width, where the second transaction response(s) may be suitable for supply to the transaction source domain. Alternatively, a combination logic may be arranged to provide the downstream-to-upstream combination function, rather than this being carried out by the same logic that performs the initial upstream-to-downstream splitting function.

The second transaction burst length and/or the threshold value may, in some embodiments, be predetermined. For example, the transaction target domain may only accept transactions having a particular burst length, or having a burst length less than some limit. The second transaction burst length may, in a particular set of embodiments, be 1. A second transaction burst length of 1 may be suitable when the transaction target domain operates in accordance with an AXI-Lite protocol (e.g. AXI4-Lite), where only single beat transfers are permitted.

However, in some embodiments, the second transaction burst length is variable. In a particular set of embodiments, the threshold value is variable, and may be varied during run-time (i.e. during operation of the device). The threshold value may be controlled by the bridge, or by some further component or logic, which may be external to the device or part of the device.

Embodiments in which the threshold value (and thus the second transaction burst length) is variable may be particularly advantageous for allowing a trade-off between throughput and latency to be controlled. This variable control over the threshold value may, in some embodiments, be provided during run-time, i.e. while the device is carrying out normal operation. Such an arrangement advantageously allows for operation to be controlled to meet real-time operational bounds and conditions, e.g. if either throughput or latency becomes a higher priority during operation. Such an arrangement may also be beneficial for reducing the burst length on a read channel responsive to a known available space in a specific FIFO (outlined in further detail below) that buffers data so as to reduce congestion for shared slaves.

The bridge outlined hereinabove may handle read transactions and/or write transactions, as appropriate. Where both read and write transactions are to be handled, separate bridges may be provided for each of these types of transactions, or a single bridge may be configured to handle both types of transaction.

The converter logic, the first interface, and the second interface are referred to collectively herein as a 'core' for ease of reference. This core may be a 'write core' when the core handles write transactions, or a 'read core' when the core handles read transactions. In some embodiments, the bridge further comprises a second such core. The first core may be a write core and the second core may be a read core. Thus, in some embodiments, the bridge further comprises:

- a third interface configured to receive a third transaction from the transaction source domain, said third transaction having a third transaction burst length;
- a second converter logic configured such that when a third transaction is received via the third interface, the second converter logic splits said third transaction into a plurality of fourth transactions each having a respective fourth transaction burst length, wherein the plurality of fourth transactions have the second bus width; and
- a fourth interface configured to send the plurality of fourth transactions to the transaction target domain. The fourth transaction burst length of the plurality of fourth transactions may be less than the third transaction burst length.

In such embodiments, the 'first' and 'second' transactions may be write transactions; and the 'third' and 'fourth' transactions may be read transactions.

Where provided, the second core may, in some embodiments, embody one or more of the optional features described hereinabove with respect to the first core, where the features of the converter logic apply to the second converter logic; the features of the first interface apply to the third interface; and the features of the second interface apply to the fourth interface, in any suitable combination or permutation.

It will be appreciated that the labelling of components and transactions as being 'first', 'second', 'third', and 'fourth' is for ease of reference only, and does not necessarily denote importance, preference, or ordering of such. The converter logic in each of the two cores may be separate, or the converter logic in each of the cores may be embodied within a single logic means (e.g. within the same processing means, processing unit, processor, or similar).

The Applicant has appreciated that, in general, data being written has to align to a multiple of the bus width. For example, assume a first bus width of 8 bytes and a second bus width of 4 bytes, and a single beat 4-byte write to a given address—in this case 'address 4'. A naïve implementation could write those 8 input bytes in 2×4 bytes to the second bus. However, one of those is unnecessary as there are actually only 4 meaningful bytes. As such, in some embodiments, the converter logic is configured to determine whether any portions of a received transaction are redundant and to remove such portions when splitting said transaction. Thus, following the example above, the converter logic may determine that address 4 implies the bytes at 0, 1, 2 and 3 will be skipped, the converter logic could also infer only the second set of 4 bytes is relevant and as such only a single beat write is produced with the 4 bytes at address 4.

Where a bridge in accordance with embodiments of the present invention is configured to handle read transactions, a 'read FIFO' (first-in-first-out) may be used to provide a 'guaranteed acceptance' function. The burst length resizing feature described above may track—e.g. using a budget mechanism—how much space in the FIFO has been promised to previous outstanding read transactions. If the current transaction fits within the remaining, unpromised or unallocated (i.e. 'free') space, it will be issued and the budget adjusted. If not, the burst length of the next partial read may be reduced to the amount of space which is available. There is an optional lower limit to this reduced length to for example wait until at least N beats could be read in one narrow transaction.

Thus, in some embodiments, the device further comprises a read FIFO, wherein the device is configured to track the available space in said read FIFO and to adjust the threshold value dependent on said available space. The budget mechanism together with the dynamic burst length adjustment may collectively provide a 'guaranteed acceptance' mode. By 'pre-allocating' parts of the read FIFO capacity, it knows how much of the FIFO will be used soon; this way there cannot be a read transaction at the narrow side which would not fit in the read FIFO at any point after it is requested. The budget mechanism may use a simple counter to track how much of the FIFO memory is allocated and thus how much is available. Read data getting ejected from the FIFO increases the available budget again. This simple scheme advantageously prevents complex book keeping or keeping lists of FIFO allocations.

In some such embodiments, the read FIFO has an enabled mode and a disabled mode. When disabled, there is no guaranteed acceptance, and the read FIFO may be used as a buffer (e.g. a standard AXI read channel FIFO) to buffer read beats.

Those skilled in the art will appreciate that in some protocols, such as AXI, there are different burst types that a transaction may use—fixed (FIXED), increment (INCR), and wrap (WRAP). The arrangement of the present invention may be configured to support some or all of these burst types. When a transaction is received from the transaction source domain, FIXED bursts may be broken up into smaller bursts (e.g. single beat transfers), while WRAP bursts may be converted into multiple INCR bursts.

The bridge may, in some embodiments, provide for 'read interleaving' in which the transaction target domain can return read response data resulting from one read burst intermixed with read response data resulting from another read burst. In general, splitting a read transaction into multiple smaller bursts relies on using the same transaction ID. As the original transaction because transactions having the same ID are generally to be returned in the same order as that the requests were issued, read data of all split bursts can be passed as read data for the original read transaction. When read bursts are split, the bridge itself can re-order the issuing of read transactions when splitting the bursts to improve the latency for small bursts (with a burst size below the appropriate limit).

The optional features outlined hereinabove in respect of various embodiments of the present invention may be combined in any suitable combination and/or permutation as appropriate.

BRIEF DESCRIPTION OF DRAWINGS

Certain embodiments of the invention will now be described, by way of non-limiting example only, with reference to the accompanying drawings in which.

DETAILED DESCRIPTION

Figure 1:
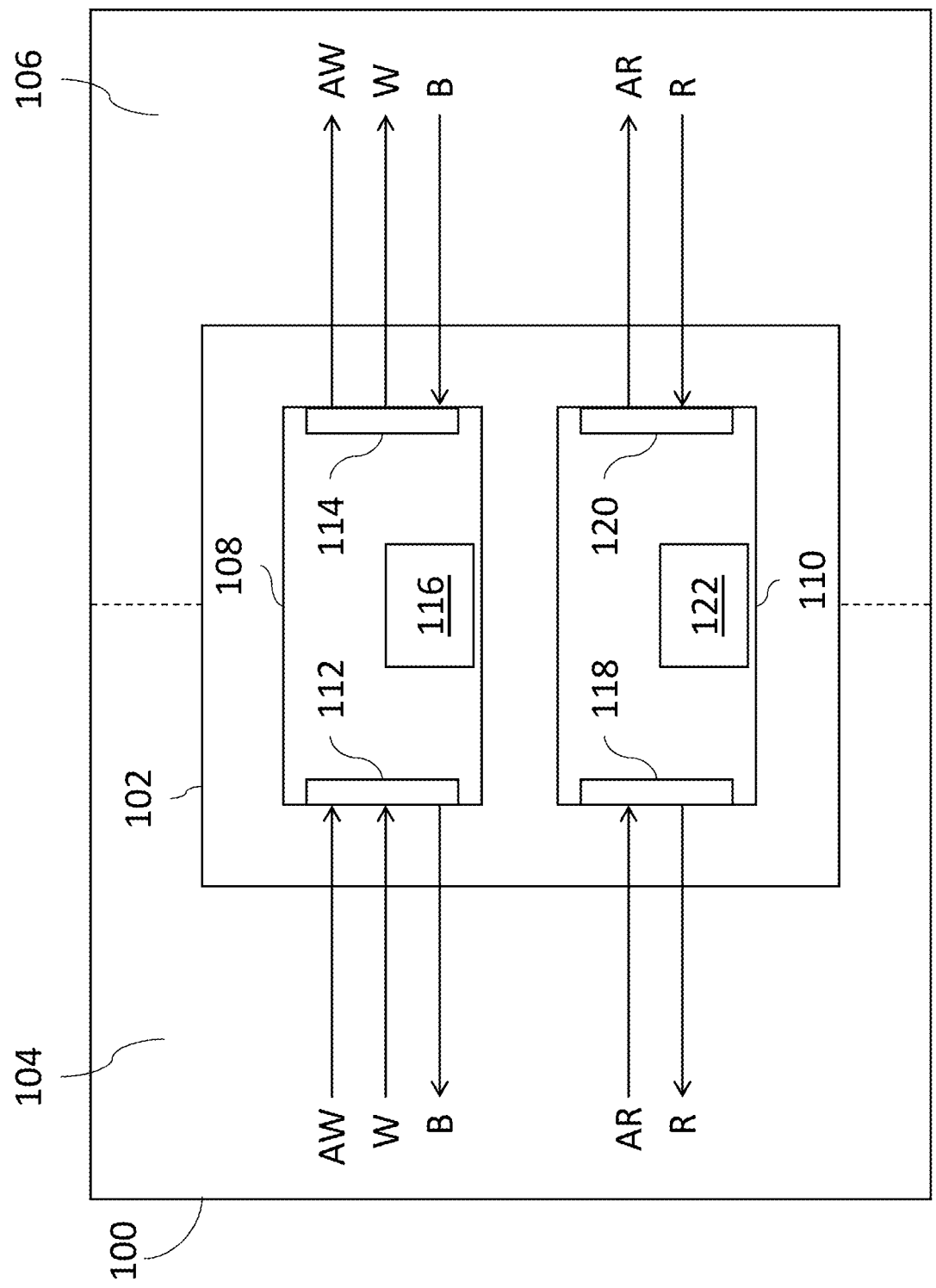
FIG. 1 is a block diagram illustrating a bridge in accordance with an embodiment of the present invention.

FIG. 1 is a block diagram illustrating an electronic device 100 comprising a bridge 102 in accordance with an embodiment of the present invention. The bridge 102 (also referred to as a 'down-breaker') is arranged to 'down-break' transactions on an AXI data bus which originate from a first transaction 'source' domain 104 to make them suitable for supply to a second transaction 'target' domain 106. The bus width of the source domain 104 is greater than the bus width of the target domain 106. Bus widths in AXI are 32/64/128/256/512/1024 bits and AXI transaction lengths are up to 256 beats.

The bridge 102 contains a write core 108 and a read core 110, each of which are described in further detail below. The write core 108 contains a first interface 112, a second interface 114, and a converter logic 116. The read core 110 contains a third interface 118, a fourth interface 120, and a second converter logic 122.

The write core 108 is arranged such that the first interface 112 receives write transactions from a device (e.g. a master device) in the source domain 104, where the write transaction is constructed from a request on the write address (AW) channel together with the data to be written on the write (W) channel, in accordance with the AXI protocol. This write transaction has a first transaction burst length, and uses the bus width of the source domain 104. However, the target domain 106 uses a narrower bus width than the source domain 104.

The converter logic 116 of the write core 108 is configured to convert (i.e. 'down-size') the transaction from the wider bus width of the source domain 104 to the narrower bus width of the target domain 106. By condensing the transaction down to a narrower bus, the length of the transaction would typically get larger in order to accommodate the data, which may result in the burst length of the resultant transaction being longer than some arbitrary burst length limit set by the second domain (which may be between one and the protocol limit). In other words, the 'area' of the transaction (i.e. its width multiplied by its burst length) should remain substantially constant to avoid data loss. However, the converter logic 116 also breaks the transaction up in to several shorter transactions (i.e. each having a smaller burst length), each of the bus width of the target domain 106. As the write core 108 performs both the down-sizing (reducing the width) and breaking up (reducing the burst length) in a single module, this process is referred to as 'down-breaking'.

This down-breaking is done to prevent the burst length exceeding the limit allowed by the target domain 106, which may be set during configuration, or may be a fixed limit. The 'maximum burst length out' limit may be set to any value, which may be an arbitrary limit or a standard value used by certain protocols. For example, when the target domain 106 is operating in accordance with an AXI-Lite protocol, the target domain 106 may accept only single burst transactions and so the converter logic 116 divides the narrower transaction into an appropriate number of single burst transactions. The shorter transactions are then supplied to the target domain 106 via the second interface 114.

When the write core 108 responds using the response (B) channel (generally a 'pass' or 'fail' response as to whether the write was successfully performed as requested). Thus for a single write request, multiple responses will be generated as a result of splitting a single transaction from the source domain 104 into multiple potentially narrower writes in target domain 106 and these may use a shorter burst length. The converter logic 116 receives these responses and compiles them into a response at the wider bus width of the source domain 104 and may supply these to the source domain 104 as a single burst response to the single write transaction from target domain 106.

The read core 110 operates in a similar manner. Read transactions received via the third interface 118 contain a request on the read address (AR) channel. The converter logic 122 of the read core 110 down-breaks the read transactions by reducing their width from the wider bus width of the source domain 104 to the narrower bus width of the target domain 106 and splitting each transaction into an appropriate number of smaller transactions for supply to the target domain 106 via the fourth interface 120. The read data on the read (R) channel is then re-combined by the converter logic 122 to use the width and burst length allowed by the source domain 104.

The converter logic 116, 122 in each core 108, 110 determines from the burst length of transactions received via the interface 112, 118 at the source domain 104 side— together with prior knowledge of the respective bus widths of each domain 104, 106—how many transactions at the reduced width and burst length will be needed. The reduction in width and burst length may then be carried out simultaneously by the converter logic 116, 122.

The burst length setting(s) for the output of the converter logic 116 of the write core 108 and/or for the converter logic 122 of the read core 110 may be varied, including at run-time, i.e. during operation of the device. This can be very useful where considerations in the trade-off between latency and throughput change during real-time operation.

Thus when receiving a write burst which exceeds the beat limit (as set by the maximum burst length out parameter discussed previously), the bridge 102 breaks up the full incoming data payload received from the upstream and forwards data payload chunks to the downstream in smaller bursts. When the write payload is transferred to a narrower bus, one incoming beat of payload on the upstream side is split into multiple beats of payload on the downstream side, assuming that the payload width exceeds the narrower bus width. Narrow (or unaligned) burst writes may be converted optimally by only transferring write data parts which can contain actual data based on the transfer size.

During reads with transfer widths exceeding the narrow bus width, the down-breaker combines multiple narrow read beats from downstream into wide read beats for the upstream side. Narrow transfer widths are not adjusted when passed and data of corresponding replies are passed unmodified. When receiving a read transaction exceeding the beat limit (set by the maximum burst length out parameter), the bridge 102 splits the read into multiple downstream transactions which are combined into responses suitable for the upstream read transaction.

The bridge 102 provides for 'read interleaving' in which the transaction target domain 106 can return read response data resulting from one read burst intermixed with read response data resulting from another read burst. In some examples, splitting a read transaction into multiple smaller bursts relies on using the same transaction ID. In some protocols such as AXI, transactions having the same ID are generally to be returned in the same order as that the requests were issued, read data of all split bursts can be passed as read data for the original read transaction. When read bursts are split, the bridge 102 can re-order the issuing of read transactions when splitting the bursts to improve the latency for small bursts (with a burst size below the appropriate limit). Alternatively, a down-breaker in accordance with embodiments of the present invention could use unique IDs for each read and suitable logic could keep track of the various IDs to ensure they are returned in the correct order.

It will be appreciated that while in this example, the converter logic 116, 122 provides the re-combination function for responses from the target domain 106, this could be carried out by a separate logic (not shown) instead.

Figure 2:
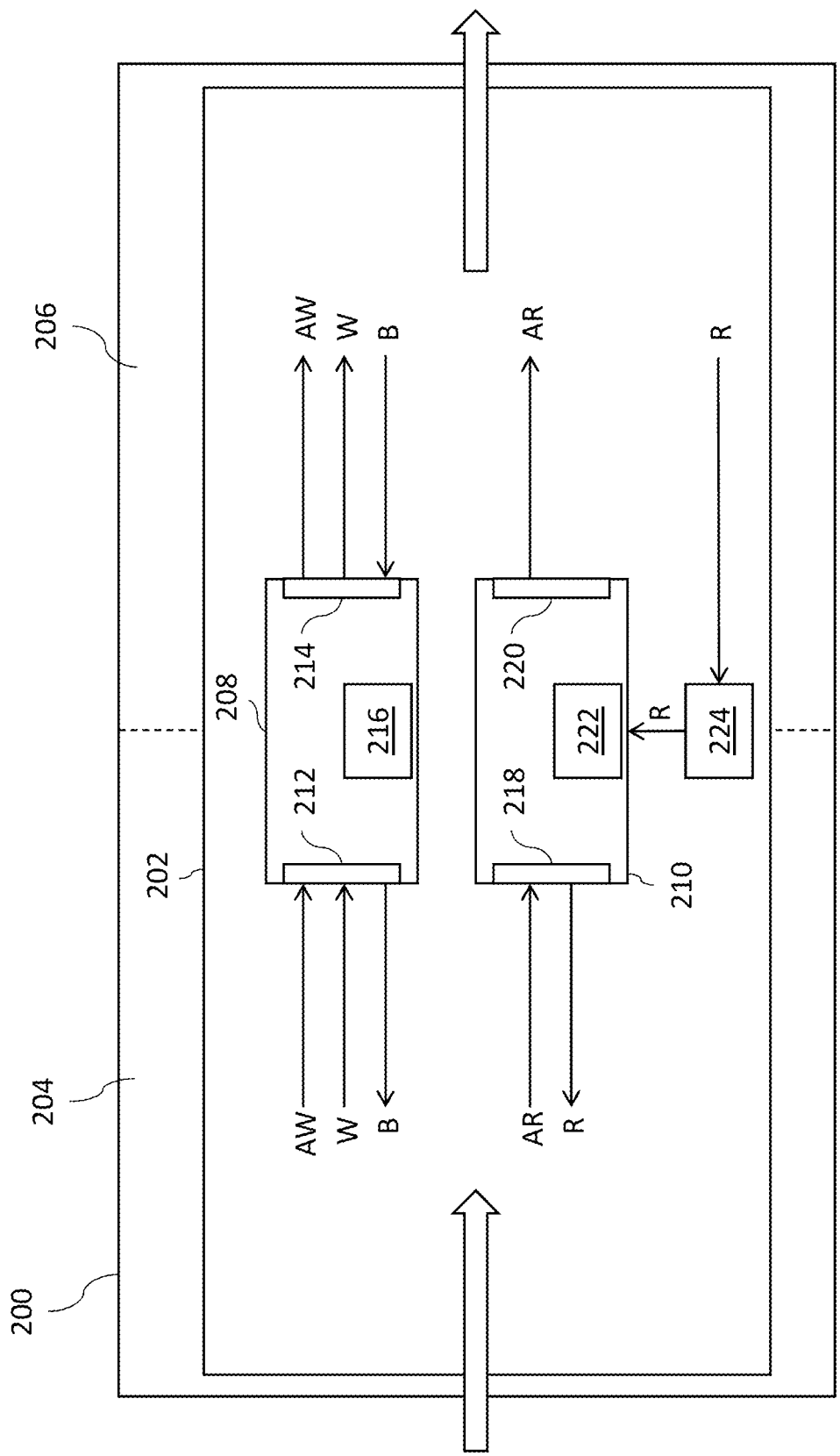
FIG. 2 is a block diagram illustrating a bridge in accordance with a further embodiment of the present invention.

FIG. 2 is a block diagram illustrating a device 200 comprising a bridge 202 in accordance with a further embodiment of the present invention. Elements having a reference numeral starting with a '2' correspond in structure and function to those elements having the same reference numeral starting with a '1' in FIG. 1, unless context dictates otherwise. In other words, an element with reference numeral '2xx' in FIG. 2 corresponds to the element having reference numeral '1xx' in FIG. 1.

However, in this embodiment, read data on the read channel R is sent to a read FIFO 224, as outlined in further detail below.

Operation of the write core 208 of FIG. 2 is as described above with reference to the write core 108 of FIG. 1. However, the read core 210 of FIG. 2 is connected to a read FIFO 224.

This optional read FIFO 224 is used for a 'guaranteed acceptance mode' for the read data channel. In this guaranteed acceptance mode, the read FIFO 224 ensures that the down-breaker can always accept the read data from the downstream side when it is ready to be returned. The read FIFO 224 imposes a requirement on the free space available before issuing the next read transaction for the next amount of read data from the downstream side. This minimum size value may be set using a 'burst level threshold' (BLT) parameter.

With the read FIFO 224 included, the read core 210 may issue only read bursts which ensure that the response fits into the read FIFO 224. In other words, this provides a 'guaranteed acceptance' function which prevents the occurrence of 'back-pressure' on the R channel.

When using the read FIFO 224 and guaranteed acceptance feature, a minimum output burst size can be specified to prevent splitting long read bursts into a lot of needlessly small bursts due to a slow upstream master. This minimum read length threshold for generated reads from longer burst reads is set via the BLT parameter outlined previously. If the free space in the read FIFO 224 is below this limit, then the read core 210 will wait until sufficient data has been forwarded to the upstream side before more data is requested from the downstream side.

Thus it will be appreciated that embodiments of the present invention provide an improved arrangement which 'down-breaks' incoming bus transactions (e.g. AXI bus transactions) to make them suitable for the transaction target domain. As outlined above, this 'down-breaking' process involves scaling the transaction down in two dimensions—both the bus width and the burst length of the transactions are reduced by the down-breaking bridge of the present invention. Having a single component that can perform both the 'down-sizing' and 'burst breaking' on the bus transactions may avoid the need for separate hardware and/or software modules that carry out each of these steps individually, and may help to mitigate against the associated downsides of having separate modules, by reducing the physical hardware size, power consumption, and/or bill of materials.

While specific embodiments of the present invention have been described in detail, it will be appreciated by those skilled in the art that the embodiments described in detail are not limiting on the scope of the claimed invention.

The invention claimed is:

1. An electronic device comprising a bridge configured to transfer data bus transactions from a transaction source domain having a first bus width to a transaction target domain having a second bus width less than the first bus width, the bridge comprising:
    a first interface configured to receive a transaction from the transaction source domain, said transaction having a first transaction burst length;
    a converter logic configured such that when a transaction is received via the first interface, the converter logic splits said transaction into a plurality of second transactions each having a respective second transaction burst length, wherein the plurality of second transactions each have a width equal to the second bus width;
    a second interface configured to send the plurality of second transactions to the transaction target domain; and
    a read FIFO;
    wherein the converter logic is configured to determine whether reducing the transaction from the first bus width to the second bus width will result in a resultant transaction having a burst transaction length that exceeds a threshold value, said converter logic being further configured such that:
    when the resultant transaction will have a burst transaction length that exceeds the threshold value, the converter logic splits said transaction into a plurality of second transactions each having a respective second transaction burst length that does not exceed the threshold value, wherein the plurality of second transactions each have a width equal to the second bus width; and
    when the resultant transaction will have a burst transaction length that does not exceed the threshold value, the resultant transaction having a width equal to the second bus width is sent to the transaction target domain via the second interface;
    wherein the threshold value is variable, and wherein the device is configured to track the available space in said read FIFO and to adjust the threshold value dependent on said available space.

2. The electronic device of claim 1, wherein the second transaction burst length is predetermined.

3. The electronic device of claim 1, wherein the second transaction burst length is variable.

4. The electronic device of claim 3, configured such that the second transaction burst length is variable at run-time.

5. The electronic device of claim 1, wherein the first and second transactions are write transactions.

6. The electronic device of claim 1, wherein the bridge further comprises:
    a third interface configured to receive a third transaction from the transaction source domain, said third transaction having a third transaction burst length;
    a second converter logic configured such that when a third transaction is received via the third interface, the second converter logic splits said third transaction into a plurality of fourth transactions each having a respective fourth transaction burst length, wherein the plurality of fourth transactions each have a width equal to the second bus width; and
    a fourth interface configured to send the plurality of fourth transactions to the transaction target domain.

7. The electronic device of claim 1, wherein the third and fourth transactions are read transactions.

8. The electronic device of claim 1, wherein the second transaction burst length of the plurality of second transactions is less than the first transaction burst length.

9. A method of transferring data bus transactions from a transaction source domain having a first bus width to a transaction target domain having a second bus width less than the first bus width, the method comprising:
   receiving a transaction from the transaction source domain, said transaction having a first transaction burst length;
   when a transaction is received, splitting said transaction into a plurality of second transactions each having a respective second transaction burst length, wherein the plurality of second transactions each have a width equal to the second bus width
   determining whether reducing the transaction from the first bus width to the second bus width will result in a resultant transaction having a burst transaction length that exceeds a threshold value, wherein the threshold value is variable;
   when the resultant transaction will have a burst transaction length that exceeds the threshold value, splitting said transaction into a plurality of second transactions each having a respective second transaction burst length that does not exceed the threshold value, wherein the plurality of second transactions each have a width equal to the second bus width, and sending the plurality of second transactions to the transaction target domain; and
   when the resultant transaction will have a burst transaction length that does not exceed the threshold value, sending the resultant transaction having a width equal to the second bus width to the transaction target domain; and
   tracking the available space in a read FIFO and adjusting the threshold value dependent on said available space.

10. The method of claim 9, wherein the second transaction burst length is predetermined.

11. The method of claim 9, wherein the second transaction burst length is variable.

12. The method of claim 11, configured such that the second transaction burst length is variable at run-time.

13. The method of claim 9, wherein the first and second transactions are write transactions.

14. A non-transitory computer-readable medium comprising instructions that, when executed by a processor, cause the processor to carry out the method of claim 9.

15. The electronic device of claim 8, wherein the fourth transaction burst length of the plurality of fourth transactions is less than the third transaction burst length.

* * * * *